United States Patent
Bhalla

(10) Patent No.: US 10,264,411 B2
(45) Date of Patent: Apr. 16, 2019

(54) GROUP COMMUNICATION FUNCTION FOR DELIVERING GROUP COMMUNICATION MESSAGES IN COMMUNICATION NETWORKS

(71) Applicant: ZTE Corporation, Shenzhen (CN)

(72) Inventor: Rajesh Bhalla, Gahanna, OH (US)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/524,073

(22) PCT Filed: Nov. 3, 2015

(86) PCT No.: PCT/US2015/058904
§ 371 (c)(1),
(2) Date: May 3, 2017

(87) PCT Pub. No.: WO2016/073533
PCT Pub. Date: May 12, 2016

(65) Prior Publication Data
US 2017/0339534 A1 Nov. 23, 2017

Related U.S. Application Data

(60) Provisional application No. 62/074,565, filed on Nov. 3, 2014, provisional application No. 62/078,273, filed
(Continued)

(51) Int. Cl.
*H04W 4/08* (2009.01)
*H04W 84/04* (2009.01)
(Continued)

(52) U.S. Cl.
CPC .............. *H04W 4/08* (2013.01); *H04W 84/04* (2013.01); *H04W 4/70* (2018.02); *H04W 76/40* (2018.02)

(58) Field of Classification Search
CPC ......... H04W 4/08; H04W 4/02; H04W 76/10; H04W 4/025; H04W 84/04; H04W 4/21;
(Continued)

(56) References Cited

U.S. PATENT DOCUMENTS

| | | | |
|---|---|---|---|
| 2001/0023187 A1* | 9/2001 | Wilhelm | H04W 4/06 455/518 |
| 2005/0149443 A1 | 7/2005 | Torvinen | |

(Continued)

FOREIGN PATENT DOCUMENTS

| | | |
|---|---|---|
| WO | 2013/046336 A1 | 4/2013 |
| WO | 2014/068143 A1 | 5/2014 |
| WO | 2014/125036 A1 | 8/2014 |

OTHER PUBLICATIONS

3GPP TS 22.468 V12.1.0 "3rd Generation Partnership Project; Technical Specification Group Services and System Aspects; Group Communication System Enablers for LTE," (Release 12), 20 pages, Sep. 2014.
(Continued)

*Primary Examiner* — Keith Ferguson
(74) *Attorney, Agent, or Firm* — Perkins Coie LLP

(57) ABSTRACT

A communication network handles group management of two different types of groups of user devices. The first type of group is an application server managed group and is used for communication to/from application servers external to the network. The second type of group is a mobile network operator managed group and is used for group communication of network-specific messages to user devices.

15 Claims, 12 Drawing Sheets

Related U.S. Application Data on Nov. 11, 2014, provisional application No. 62/082,392, filed on Nov. 20, 2014, provisional application No. 62/105,674, filed on Jan. 20, 2015.

(51) Int. Cl.
  *H04W 4/70* (2018.01)
  *H04W 76/40* (2018.01)

(58) Field of Classification Search
  CPC ... H04W 64/00; H04W 72/121; H04W 76/40; H04W 88/18
  USPC .......... 455/518, 519, 516, 414.1, 414.2, 455/456.1–457, 466, 412.1, 412.2, 507, 455/508, 422.1, 403, 445, 500, 517; 370/260, 259, 328, 338
  See application file for complete search history.

(56) References Cited

U.S. PATENT DOCUMENTS

| | | | |
|---|---|---|---|
| 2008/0008106 A1* | 1/2008 | Boberg | H04L 12/185 370/270 |
| 2010/0183133 A1 | 7/2010 | Zhang | |
| 2013/0136072 A1 | 5/2013 | Bachmann et al. | |
| 2014/0189796 A1 | 7/2014 | Mashimo | |
| 2015/0039691 A1* | 2/2015 | Sharma | H04L 65/1016 709/204 |
| 2016/0165413 A1 | 6/2016 | Bhalla | |
| 2017/0251342 A1 | 8/2017 | Bhalla | |

OTHER PUBLICATIONS

3GPP TR 23.768 V12.1.0 "3rd Generation Partnership Project; Technical Specification Group Services and System Aspects; Study on architecture enhancements to support Group Communication System Enablers for LTE (GCSE_LTE)," (Release 12), 63 pages, Jun. 2014.

International Search Report and Written Opinion dated Mar. 31, 2016 for International Application No. PCT/US2015/058904, filed on Nov. 3, 2015 (8 pages).

European Search Report dated Sep. 29, 2017 for European Application No. 15857541.5, filed on Nov. 3, 2015 (9 pages).

3GPP TR 23.769 V0.3.0 "3rd Generation Partnership Project; Technical Specification Group Services and System Aspects; Group based Enhancements," (Release 13), 32 pages, Oct. 2014.

Korean Office Action dated Oct. 21, 2018 for Korean Application No. 10-2017-7015189, filed on Nov. 3, 2015 (4 pages).

\* cited by examiner

GROUP COMMUNICATION FUNCTION FOR DELIVERING GROUP COMMUNICATION MESSAGES IN COMMUNICATION NETWORKS

CROSS REFERENCE TO RELATED APPLICATIONS

This patent document claims the benefit of priority of U.S. Provisional Patent Application No. 62/074,565, filed on Nov. 3, 2014; U.S. Provisional Patent Application No. 62/078,273, filed on Nov. 11, 2014; U.S. Provisional Patent Application No. 62/082,392, filed on Nov. 20, 2014; and U.S. Provisional Patent Application No. 62/105,674, filed on Jan. 20, 2015. The entire contents of the before-mentioned patent applications are incorporated by reference as part of the disclosure of this document.

BACKGROUND

This document relates to wireless communications.

Wireless cellular networks today provide coverage to almost all areas where humans can reach. Even in remote areas, it is not uncommon to find wireless connectivity for data and voice communication. The wireless connectivity in different locations may be quite different in terms of the bandwidth and other services available to a user device.

SUMMARY

This document discloses a solution that enables the delivery of Group based messages to different types of groups using network-side capabilities. One group time may include a group of user devices for group communication with an application server that is external to the network, e.g., is managed by a non-network operator entity. The other type of group may include user devices for the purpose of network specific communication such as control and management data for keeping the network running in an optimal manner.

In one aspect techniques implemented at a network-side in a communication network is disclosed. The method includes deploying, on a first computer platform, a first group management module that enables at least one of creation of a first group of user devices, deletion of the first group of user devices, update to membership of the first group of user devices and communication to the first group of user devices, facilitating group communication from an application server to members of the first group of user devices, deploying, on a second computer platform, a second group management module that enables at least one of creation of a second group of user devices, deletion of the second group of user devices, update to membership of the second group of user devices and communication to the second group of user devices, and facilitating network-internal communication from a network operator managed entity to members of the second group of user devices.

In yet another aspect, a communication network comprises a group management function for group communication between an application server and a group of wireless devices.

These, and other, aspects are further described below with reference to the drawings.

DETAILED DESCRIPTION

Figure 1:
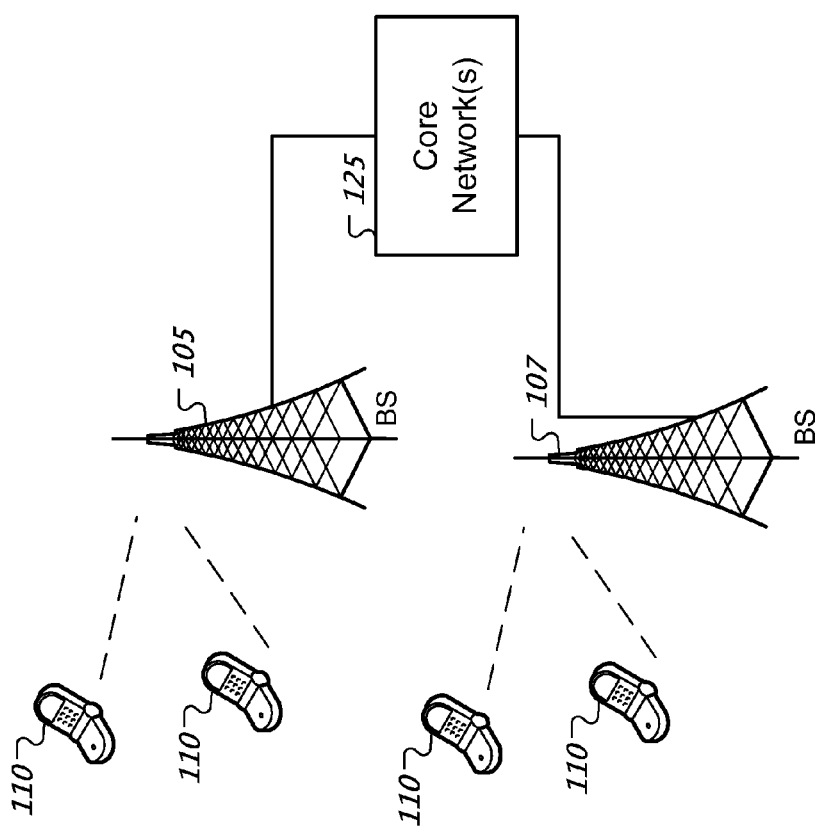
FIG. 1 shows an example of a wireless communication system.

In the description, section headings are used to improve readability of the description and do not in any way limit the scope of the disclosed technique to that section.

Applications generally involve group of devices, with each group involving 100s or 1000s of devices. This document discloses a method for the delivery of Group Messages using different message delivery mechanisms to a group of devices (UEs) within a geographic area. It is possible that the UEs that are members of the same Group may have different capabilities and connectivity. The messages may also need to be delivered across different areas of the same PLMN with different capabilities, different radio access technologies or even spread across different PLMNs.

Some popular mobile applications, such as Twitter and WhatsApp, provide application-layer connectivity to a group of users, by which, one user can transmit his messages (audio/text/image) to a group of users. These technologies, however, lack a notion of a geographical association of the group. Furthermore, because the groups are formed at application layer, typically at the web servers operated by Twitter and WhatsApp, the actual messaging to multiple wireless users within the same cell occurs on unicast messages to the users, thereby un-necessarily wasting the wireless bandwidth.

3GPP architecture for Machine-Type Communication (TS23.682) allows the network operators (SPs) and application service providers (ASPs) to be independent entities. The architecture allows the SP to take the role of ASP as well.

The service model in which the SP takes the role of ASP may be referred to as the network operator controlled service mode. When an ASP is a 3rd party (e.g. a vertical) independent of the SP, the service model may be referred to as 3rd party (vertical) controlled service model. Such vertical centric service models are being specified by M2M/IoT for a.

The follows examples describe some use cases of such vertical-centric service models.

XYZ Electric Company (3rd party ASP) has electric meters deployments, with smart meters deployed over a large state/country/multinational geographic area. The vertical (3rd party ASP) has control of its smart meters including maintaining grouping/sub-grouping information. The smart meters could receive services via wireless, wireline, satellite links etc. (underlying networks). At the underlying network level, the ASP identifies the smart meters (devices) via an address that is specific to the underlying network technology. For example, for services delivered over a 3GPP network, the ASP controlled groups are mapped to the address of the smart meter devices (e.g. IMSI) in the 3GPP network.

B. Now taking the example of automotive services; such services are global. Considering BAM Auto Company tracking services for its brand of autos via their VIN identifiers, BAM_Services grouping information could be modeled as VIN@BAM_Services. In one geography, the SP can be 3GPP SP_A. In another geography the SP can be 3GPP SP_B, 3GPP SP_C, or some satellite service provider etc. to name a few. Such autos are mobile resulting in autos (possibly) crossing over from one SP domain to another SP domain. In this case, in addition to mapping the grouping information at BAM_Services (ASP) to the 3GPP network specific device IDs of the communication modules in the autos, tracking location information of the autos (devices) may also be needed.

C. Considering a transportation services model (e.g. container services): the modem can be a multi-technology modem; 3GPP wireless, landline/ethernet, satellite etc. Appropriate modem connection will be used depending on the location of the container. This scenario may require tracking container (device) location, and limiting the delivery of group messages to the specific geographic locations.

D. In smart home environment, home gateways can receive services via 3GPP wireless, fiber, cable. There are multiple appliances behind the home gateway—from vendors Ven_A, Ven_B, Ven_C etc. Grouping information for Ven_A refrigerator services is maintained by Ven_A. Ven_B maintains grouping information for its washer/dryers. TV grouping information is with Ven_C etc. These constitute different 'applications' on the home gateway. The 'applications' can be added/removed as the home owner buys/disposes off different appliances.

The solution for the Key Issue: Group based addressing and Identifiers needs to address the grouping requirements associated with such use cases.

Discussion

Applications generally involve group of devices, with each Group involving 100s or 1000s of devices. It is also possible for the devices to host multiple applications with each application involving different group of devices. For simplicity, the devices that belong to a Group are referred to as 'Group Members'. Using this terminology, a Group can involve 100s or 1000s of Group Members. Group Members can be static or can evolve dynamically, with Group Members being added and/or removed during the lifetime of a Group. As applications evolve; the Service Capability Server (SCS)/Application Server (AS) can create new Groups with associated Group Members, and can remove existing Groups.

Observation 1: Applications generally involve a group of devices, with 100s or 1000s of devices in a Group.

Observation 2: The devices can host multiple applications, with each application involving different group of devices.

Observation 3: Group membership can be static or dynamic, with Group Members being added and/or removed during the lifetime of a Group.

Observation 4: SCS/AS can create new groups with associated Group Members, and remove existing Groups.

It is also possible for the SCS/AS to communicate with multiple underlying networks, with Group Members being spread across different underlying networks. Such underlying networks could be one or more 3GPP operator networks (PLMNs) or could be non-3GPP networks as well. Group Members that are mobile can move in and out of coverage of the PLMNs.

Observation 5: Not all Group Members (devices) may be receiving services from the same PLMN.

Observation 6: Group Members that are mobile, may receive services from different PLMNs, or even from non-3GPP networks during the lifetime of a Group.

Observation 7: It needs to be possible to bind the identity of the 3GPP devices (e.g. IMSI) that are member of a Group to the Group's External-Group-ID.

Observation 8: The identity of a 3GPP device (e.g. IMSI) can be bound to more than one External-Group-ID.

Observation 9: For mobile devices, the identity of the Group Members that are bound to the Group's External-ID can change during the lifetime of a Group.

Observation 10: In order to support geographic location specific delivery of Group Messages, it needs to be possible to track the location of Group Members within a PLMN.

FIG. 1 shows an example of a wireless communication system. A wireless communication system can include one or more base stations (BSs) 105*a*, 105*b*, one or more wireless devices 110*a*, 110*b*, 110*c*, 110*d*, and an access network 125. A base station 105*a*, 105*b* can provide wireless service to wireless devices 110*a*, 110*b*, 110*c* and 110*d* in one or more wireless sectors. In some implementations, a base station 105*a*, 105*b* includes directional antennas to produce two or more directional beams to provide wireless coverage in different sectors.

The access network 125 can communicate with one or more base stations 105*a*, 105*b*. In some implementations, the access network 125 includes one or more base stations 105*a*, 105*b*. In some implementations, the access network 125 is in communication with a core network (not shown in FIG. 1) that provides connectivity with other wireless communication systems and wired communication systems. The core network may include one or more service subscription databases to store information related to the subscribed wireless devices 110*a*, 110*b*, 110*c* and 110*d*. A first base station 105*a* can provide wireless service based on a first radio access technology, whereas a second base station 105*b* can provide wireless service based on a second radio access technology. The base stations 105*a* and 105*b* may be co-located or may be separately installed in the field according to the deployment scenario. The access network 125 can support multiple different radio access technologies.

Various examples of wireless communication systems and access networks that can implement the present techniques and systems include, among others, wireless communication systems based Code Division Multiple Access (CDMA) such as CDMA2000 1×, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). In some implementations, a wireless communication system can include multiple networks using different wireless technologies. A dual-mode or multi-mode wireless device includes two or more wireless technologies that could be used to connect to different wireless networks. In some implementations, a wireless device can support Simultaneous Voice-Data Operation (SV-DO).

Figure 2:
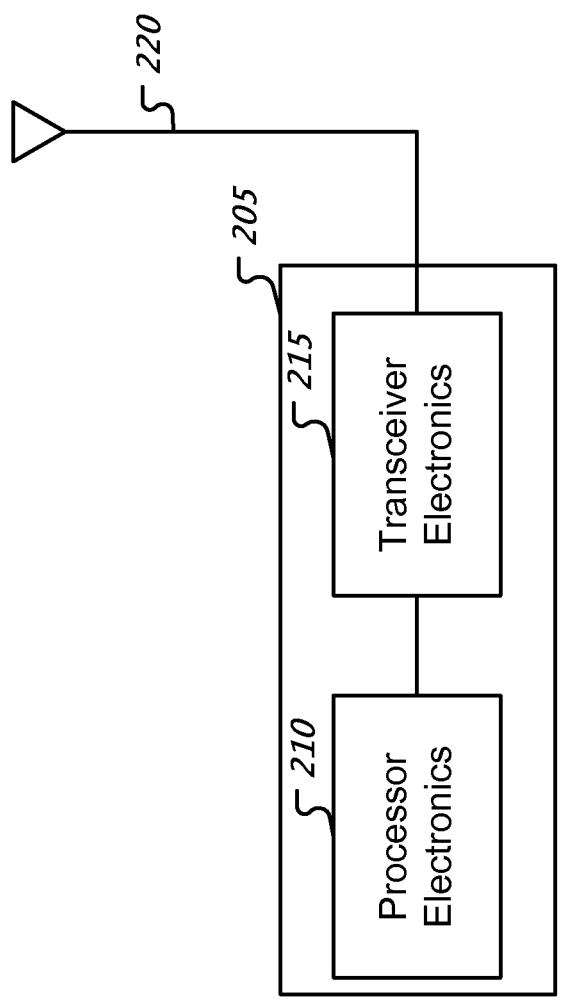
FIG. 2 shows an example of a radio station architecture.

FIG. 2 is a block diagram representation of a portion of a radio station 205. A radio station 205 such as a base station or a wireless device can include processor electronics 210 such as a microprocessor that implements one or more of the wireless techniques presented in this document. The radio station 205 can include transceiver electronics 215 to send and/or receive wireless signals over one or more communication interfaces such as antenna 220. The radio station 205 can include other communication interfaces for transmitting and receiving data. Radio station 205 can include one or more memories configured to store information such as data and/or instructions. In some implementations, the processor electronics 210 can include at least a portion of the transceiver electronics 215. In some embodiments, at least some of the disclosed techniques, modules or functions are implemented using the radio station 205.

Figure 3:
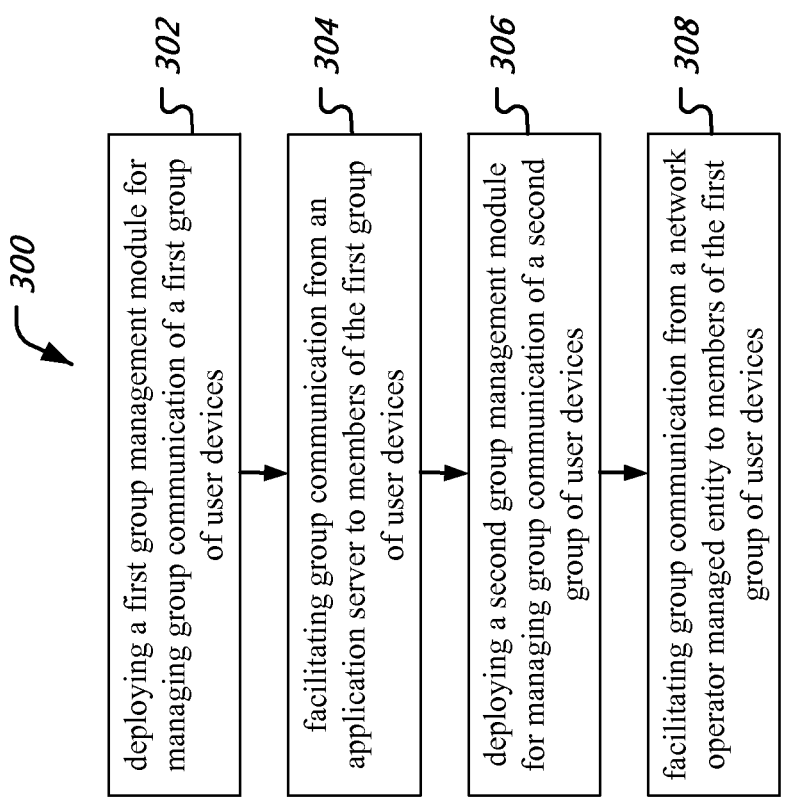
FIG. 3 shows an example flowchart for a method of group communication with a logical group of user devices operating in different networks.

FIG. 3 shows an example flowchart of a method 300 of group communication. Various embodiments in which the method 300 can be implemented are further described with reference to FIGS. 4 to 12. The method may be implemented on a network-side equipment.

At 302, the method 300 includes deploying a first group management module for managing group communication of a first group of user devices. The first group management module can be implemented, e.g., in the SCEF function described in the present document. The first group of user devices may correspond to the SC/application server group described in the present document. The deployment may include, e.g., installing and/or activating a network equipment with the functionality described with respect to the SCEF or the group communication function described herein. The first group communication module thus may operate to manage group communication of a first group of user devices.

At 304, the method 300 includes facilitating group communication from an application server to members of the first group of user devices. This document provides various examples of messages that can be exchanged for establishing groups and carrying group communication.

At 306, the method 300 includes deploying a second group management module for managing group communication of a second group of user devices. The second group may be an MNO group as described in the present document. The deployment of the second group management module may be achieved by installing and/or activating a software program on a (by a) network equipment.

At 308, the method 300 includes facilitating group communication from a network operator managed entity to members of the first group of user devices. The group communication is facilitated by, e.g., exchanging messages and responding to messages by performing actions as expected by the transmitter of the message, as described in the present document.

The method 300 may further including tracking current locations and identities of user devices that are members of the first group of user devices. For example, a user device might be a mobile phone that has multiple network connection capabilities and may from time to time be in the cellular network, e.g., its home network, or in a visited communication network. The group management module may track location of the user device and provide that information to facilitate group communication to the user device.

In some embodiments, a communication apparatus includes a memory for storing instruction and a processor for reading the instructions from the memory and implementing the method 300.

In some embodiments, the first group communication module may use the external and internal IDs, as described in this document, to manage and track device groups during operation of the network.

In 3GPP document TR 23.769, released in November 2014, Group based enhancements for conducting group communication in a 3GPP network are outlined. The additional techniques that add further value to the existing 3GPP functionalities, among other advantages, are included in the present document.

While the embodiments in the present document are provided with respect to 3GPP TR 23.769 for illustration, the presently described techniques can also be implemented in other wireless networks also.

The terminology used in the present document is consistent with that used in the 3GPP document TR 23.769, unless otherwise noted.

Example Embodiments for 3GPP Networks

This document describes example procedures used with dynamic group membership. For group operations such as group-based APN congestion, roaming status of all members of a group, and counting of devices belonging to a group in a given area, static group memberships may be used. For groups operations used for the delivery of messages, dynamic membership of groups can be supported. Such dynamic group membership for message delivery does not require updates to the grouping information at the HSS. Updates to the group membership information at the HSS, if needed, is via co-ordination between the Mobile Network Operator and SCS/AS provider.

As described herein, applications generally involve group of devices, with each group involving 100s or 1000s of devices. MTC devices can host multiple applications with each application involving different group of devices. The devices that belong to a group are referred to as 'group members'. Thus, a group can involve 100s or 1000s of group members. New groups can be created with associated group members, and existing groups can be removed. Group membership can be static or can evolve dynamically, with group members being added and/or removed during the lifetime of a group.

Example Embodiment 1

This embodiment is design to address two types of groups:
Mobile Network Operator (MNO) managed groups;
SCS/AS managed groups.

Group operations that expect core network nodes, e.g. the HSS or MME to be aware of the membership of UEs in the group, can be addressed by MNO managed groups. Group-based APN congestion, roaming status of all members of a group, and counting of devices belonging to a group in a given area examples of services using MNO managed groups. Depending on the nature of services offered, the MNO can create such groups with associated membership, and can remove existing groups. Group membership can be static or can evolve dynamically, with group members being added and/or removed during the lifetime of a group. For such groups this solution uses maintenance of the group membership at the HSS. Such groups may have a relatively static membership (to avoid heavy impact on the HSS) and require that the HSS and other core network nodes be aware of the group membership.

SCS/AS managed groups are generally used for operations such as the delivery of group messages. Depending on the Applications that need to be supported, the SCS/AS can create new groups with associated group members and remove existing groups. For such groups also, group membership can be static or can evolve dynamically, with group members being added and/or removed during the lifetime of a group. Such groups are maintained at the SCS/AS. Maintaining such groups at the HSS is not required. Any updates to the group membership information at the HSS for SCS/AS managed groups as a result of such updates at the SCS/AS is via co-ordination between the Mobile Network Operator and SCS/AS provider. Such procedures are outside the scope of being standardized.

MNO managed groups are identified by Internal-Group-IDs, The Internal-IDs of the 3GPP devices that are members of the group are bound to group's Internal-Group-ID. Both, static and dynamic binding of Internal-IDs to an Internal-Group-ID can be supported. A 3GPP device can support multiple operator provided services, and the identity of a 3GPP device (Internal-ID) can be bound to more than one Internal-Group-ID.

SCS/AS managed groups are identified by External-Group-IDs. The External-IDs of the 3GPP devices that are members of a group are bound to the group's External-Group-ID. Both, static and dynamic binding of External-IDs to External-Group-ID can be supported. A 3GPP device can host multiple applications, and the identity of a 3GPP device can be bound to more than one External-Group-ID.

For MNO managed groups, other than managing the group identification (Internal-Group-ID) and associated group membership (Internal-IDs) at the HSS, no other enhancements are needed for addressing this key issue. An example of how such groups can be used is in the solution for the key issue "NAS Level Congestion Control based on APN and group identifier" in clause 5.4.3 of 3GPP document TR 23.769.

For SCS/AS managed groups, the disclosed technique provides two building blocks:

(1) the ability to determine the Internal-Group-ID, if available, and the Internal-IDs of group members based on an External-Group-ID and External-IDs provided by the SCS/AS, and (2) the ability to request that the SCEF add or remove Internal-IDs to/from the local copy of a group information that the SCEF maintains.

Figure 4:
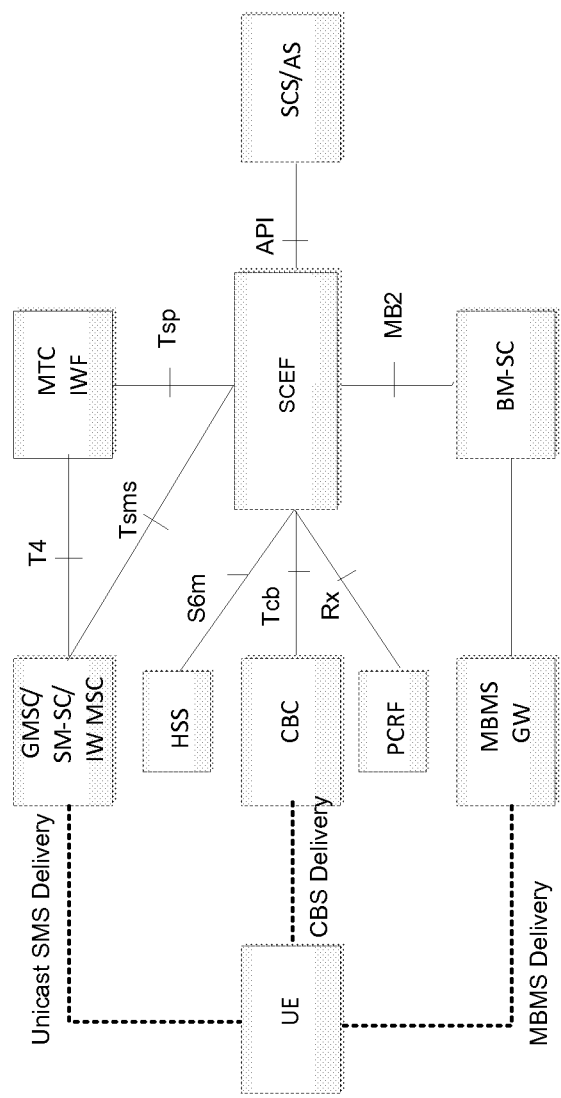
FIG. 4 an example architecture for Group Based Addressing by SCS/AS and Identification of Group Members.

FIG. 4 shows the high level architecture, wherein an SCEF may contain internal functionality related to a group of users, e.g., a Group Management Function (GMF). Through this internal function, the SCEF maintains a local copy of the binding of the Internal-IDs (e.g. IMSI) and External-IDs (e.g. MSISDN) of group members with the group's External-Group-ID. Group's Internal-Group-ID can also be maintained if such information is provided by the HSS. Other information needed for the delivery of group services can also be maintained. For example, for a PLMN that supports MBMS, the SCEF's internal GMF can maintain the TMGIs allocated to the groups. Location information of the group members can also be maintained at the GMF, if needed.

The solutions for the issue: "Message delivery to a group of devices" in clause 5.1.3 (3GPP document TR 23.769) are examples of how SCS/AS managed grouping information at the SCEF can be used.

Figure 5:
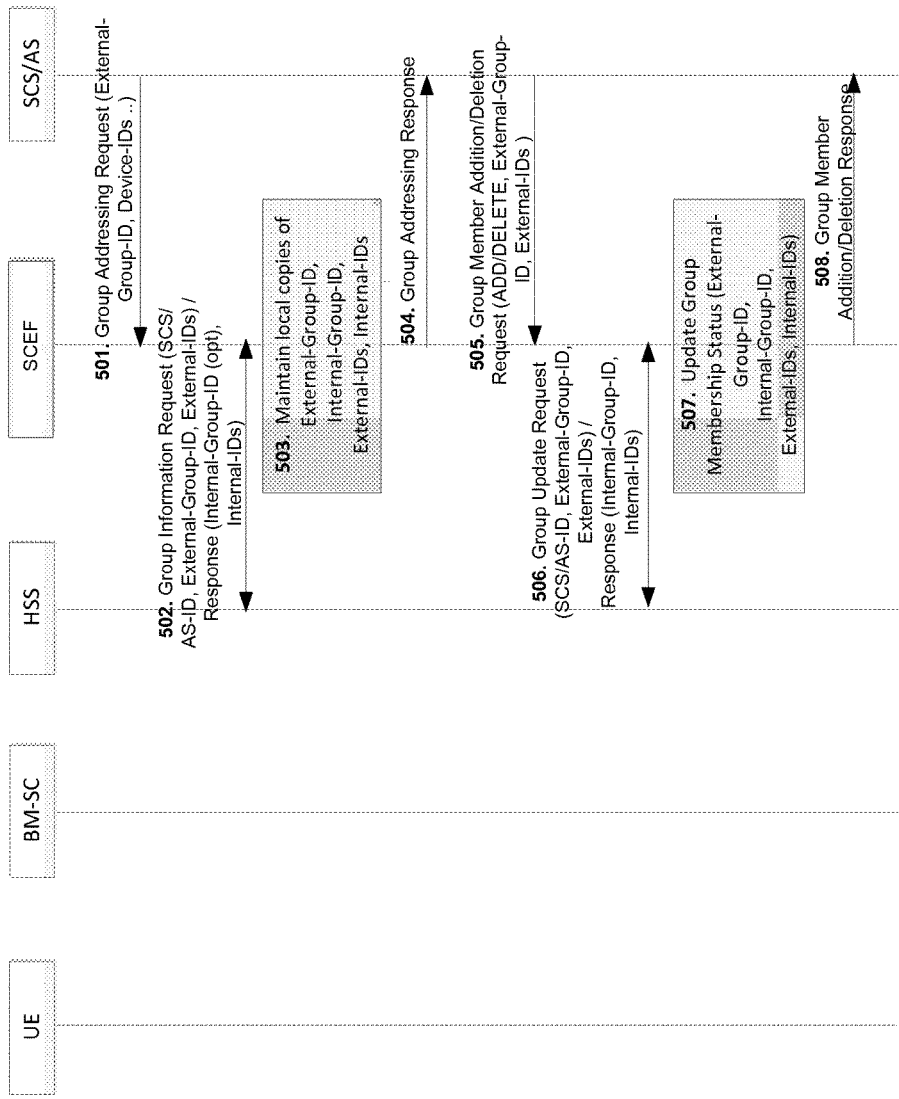
FIG. 5 shows an example procedure flow for Group Based Addressing and Identification of Group Members.

FIG. 5 illustrates the procedure flow for SCS/AS managed group addressing and identification of group members. In this illustration, the SCEF includes an internal GMF.

501. SCS/AS requests the SCEF support for an application specific group by sending a Group Addressing Request message. The message includes the External-Group-ID and may include the External-IDs of the devices (UEs) that are members of the external group.

502. The SCEF exchanges Group Information Request/Response messages with the HSS to determine if the SCS/AS is authorized to send a Group Information Request for the External-Group-ID. The HSS maps any received group member External-IDs to Internal-IDs. The External-Group-ID can be mapped to Internal-Group-ID if such information is available at the HSS. The HSS returns the Internal-Group-ID, if available, and the Internal-IDs to the SCEF, including the mapping of External-IDs to Internal-IDs, for the if External-IDs were submitted in the Group Information Request.

In some embodiments, a 1-to-1 mapping between External-Group-ID and Internal-Group-ID, and between External-ID and Internal-ID may be used.

503. The SCEF, using its internal GMF, can maintain a local copy of the mapping of External-Group-ID with information such as group member Internal-IDs, and Internal-Group-ID associated with the group members.

The local copy of the information is may be kept, for example, to reduce the impact on core network nodes from frequent queries that are likely to return the same information as that already known to the SCEF.

504. The SCEF confirms to the SCS/AS with a Group Addressing Response message.

Steps 505 to 508 constitute the building block providing the ability for the SCS/AS to request that a group member be added or deleted from the local copy of grouping information an internal group maintained by the SCEFHSS.

505. The SCS/AS sends a Group Member Addition/Deletion Request to the SCEF to have an additional External-IDs added/deleted to/from an External-Group-ID.

506. The SCEF exchanges Group Update Request/Response messages with the HSS to determine if the SCS/AS is authorized to send such a group membership request. The HSS maps the External-Group-ID to the Internal-Group-ID and maps the External-IDs to the Internal-IDs. The HSS updates the subscription record for the device, adding it to the identified internal group.

507. The local copy of the Group membership information at the SCEF can be updated by adding/deleting Internal-IDs received from the HSS, to the group membership for External-Group-ID.

508. The SCEF confirms the group addition to the SCS/AS with a Group Member Addition/Deletion Response message.

An existing SCEF may be modified to receive, process and respond to messages from the SCS/AS, as identified in the procedure flows. The SCEF may also be modified to interact with the HSS for managing Group membership, and Group Member status information such as the mapping of External-Group-ID to Internal-Group-ID and mapping of External-IDs to Internal-IDs and to maintain local copy of mapping between the group identifier and device group membership.

An existing HSS may be modified to, for MNO managed groups, manage group membership, such as maintain group identification (Internal-Group-ID) and associated group member (Internal-IDs). The HSS may also be modified to, for SCS/AS managed groups, support interactions with the SCEF for providing information such as mapping of External-IDs to Internal-IDs, mapping External-Group-IDs to Internal-Group-IDs., and modifying internal group membership.

An existing S6m Interface may be modified to, for SCS/AS managed groups, support interactions between the SCEF and the HSS for messages used for the authorization of the SCS/AS that is requesting group operations, and support interactions between the SCEF and the HSS for messages used for the mapping of External-Group-ID to Internal-Group-ID and mapping External-IDs to Internal-IDs.

This embodiment supports two types of groups: MNO managed groups and SCS/AS managed groups. MNO managed groups (which are controlled by the Operator) are hosted by the HSS. This type of groups are typically used for operator controlled services e.g. NAS-congestion control. An example of the use of such type of groups is for services as in clause 5.4.3 (3GPP document TR 23.769).

SCS/AS managed groups are hosted at the SCS/AS with a local copy at the SCEF. The local copy at the SCEF has mapping of External-IDs to Internal-IDs. Such SCS/AS managed groups need not be replicated at the HSS. This type of groups are typically used for message delivery services. Example of the use of this type of groups is for services in clause 5.1.3 (3GPP document TR 23.769).

Both types of groups can be created with associated group members, and existing groups can be removed. Group membership for both types of groups can be static or can evolve dynamically, with group members being added and/or removed during the lifetime of a group.

For MNO managed groups, HSS manages group membership such as maintaining group identification (Internal-Group-ID) and associated group membership (Internal-IDs). There is no impact to the SCEF, S6m interface or to the UEs.

For SCS/AS managed groups, HSS maps group member External-IDs to 3GPP network specific Internal-IDs. Such capabilities are already available at the HSS. SECF can cache such mapped grouping information. Local caching of grouping information at the SCEF reduces the impact on core network nodes, such as the HSS, for providing group based services. The UEs do not need to be aware of Internal or External grouping information, hence there is no impact to the UEs.

This solution supports all solutions for the Key Issues 'message delivery' and 'group-specific NAS congestion control' that are described in the TR23.769. It is, therefore, recommended that the solution in clause 5.5.3.1 (3GPP document TR 23.769) be adopted as the solution for the Key Issue—"Group based addressing and identifiers".

Example Embodiment 2

Figure 6:
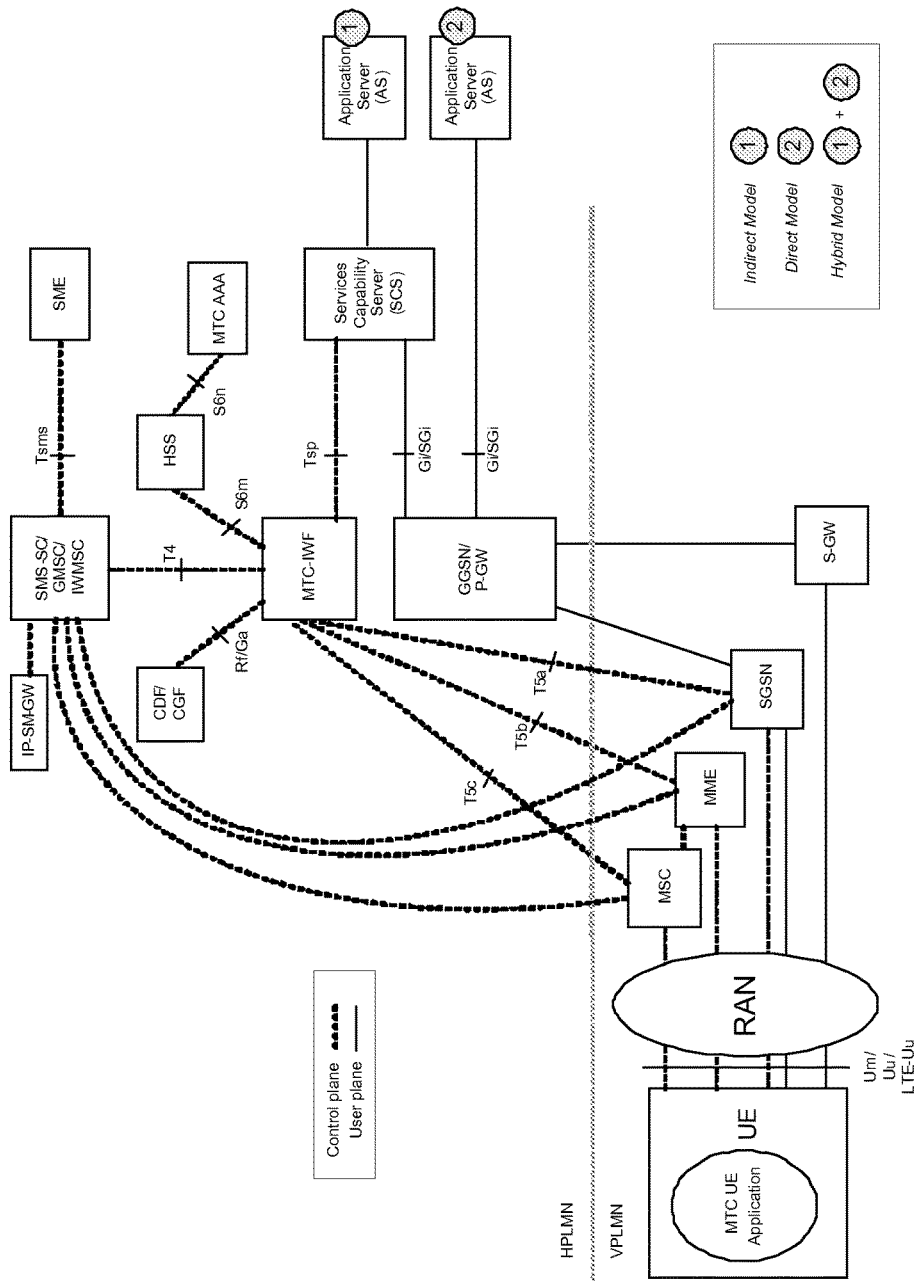
FIG. 6 shows an example network architecture.

FIG. 6 shows an example of a 3GPP network in which Machine-type communication can be implemented. The logical separation of Home PLMN and Visited PLMN is shown by the line 402.

In some implementations, application specific Groups are identified by External-Group-IDs. When the underlying network is a 3GPP SP, the AS/SCS can pass External-Device-ID(s) of group members along with the External-Group-ID to the SCEF. The External-Device-ID is mapped to Internal-Device-ID (e.g. IMSI) within the 3GPP network. In view of Observation 2; the identity of a 3GPP device can be bound to more than one External-Group-ID. Other information, such as geographic area specific information, device location tracking information etc. can also be maintained depending on the nature of services offered. The architecture allows such GMF function to be bundled with some 3GPP EPS function as well. There is no need to configure/provision any grouping information for the delivery of group messages within the 3GPP network.

Example Embodiment 3

Figure 7:
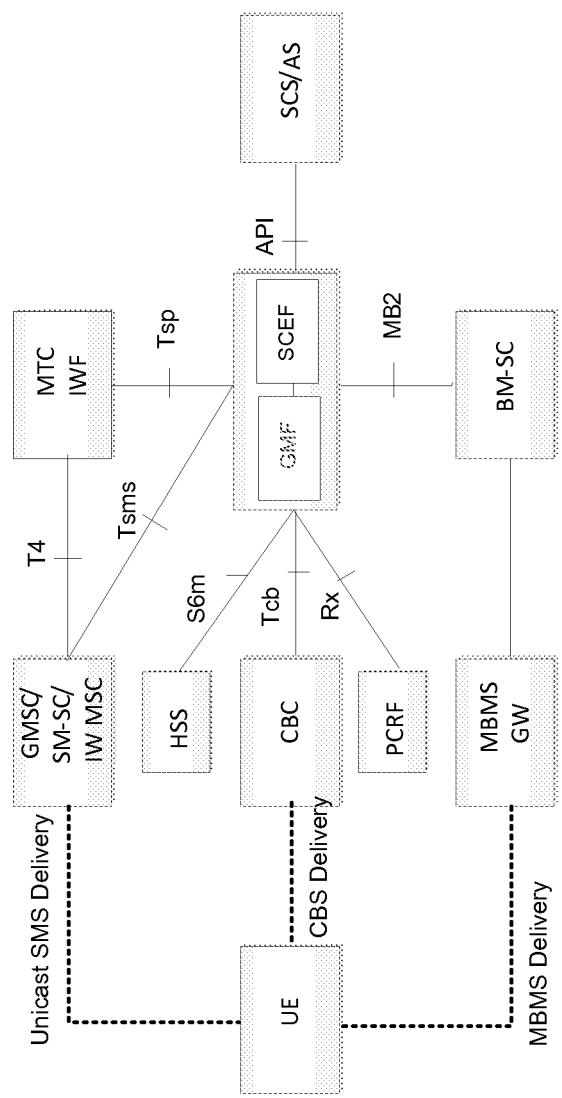
FIG. 7 an example architecture for Group Based Addressing by SCS/AS and Identification of Group Members.

FIG. 7 shows the high level architecture that allows binding of the identity of Group Members to the Group's External-Group-ID. Tracking of the location information of the Group Members can also be supported. Such tracking of location information of the Group Members may be needed for geographic location specific delivery of group messages.

The architecture illustration in FIG. 7 shows a new functional entity: the Group Management Function (GMF). GMF is co-located with the Service Capability Exposure Function (SCEF) and maintains binding of the identity of the Group Members (e.g. IMSI) with the Group's External-Group-IDs. Location information of Group Members can also be maintained at the GMF, if needed.

Other possible configurations, such as the GMF being a standalone functional entity, or GMF integrated with some EPC functional entity can also be supported.

Figure 8:
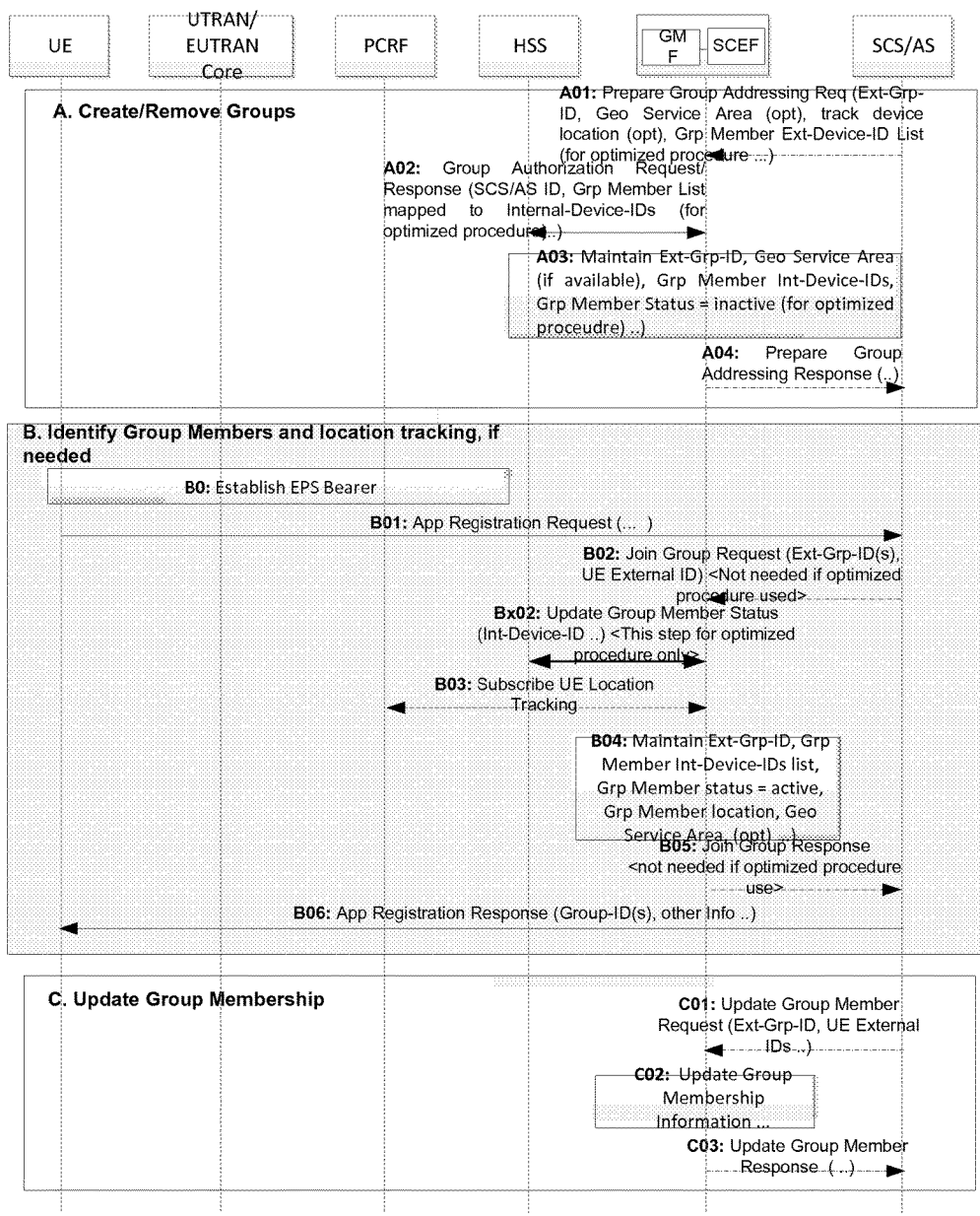
FIG. 8 shows an example procedure flow for Group Based Addressing and Identification of Group Members.

FIG. 8 illustrates the procedure flow for group based addressing and identification of group members. GMF is co-located with the SCEF. Procedure steps internal to the 3GPP network are shown as 'solid' lines. Procedure steps external to the 3GPP network are shown as 'broken' lines. Dotted lines represent optional steps.

Phase A: Create/Remove Groups:

Two types of procedures are supported: standard procedure and optimized procedure. The optimized procedure is useful for devices (UEs) that are dedicated to a single application. The SCS/AS informs the GMF in the SCEF about the application specific Group (External-Group-ID) that is to be supported for the delivery of group messages. For optimized procedure, the SCS/AS passes the identity (External-Device-IDs) of the group members also to the GMF. The GMF checks with the HSS if the SCS/AS is authorized to send such a request. If identity of group members is received (optimized procedure), the HSS maps the External-Device-IDs to Internal-Device-IDs. Similarly, the SCS/AS can inform the GMF if a an already assigned application specific Group is to be removed in the 3GPP network.

Step A01: SCS/AS requests the GMF in the SCEF to support an application specific Group for group addressing by sending Prepare Group Addressing Request message. The message includes the External-Group-ID, and may include the Geo Service Area information and device location tracking request also, if needed for geographic area specific delivery of group messages. For optimized procedure, the identity of the devices (UEs) that are member of the application specific Group (UE External IDs), are also included.

When Geo Service Area information is not provided, group messages are delivered across the PLMN service area. In this case location tracking of the UEs in Step B03 is not performed.

Step A02: GMF exchanges Group Authorization Request/Response (External-Group-ID, SCS/AS Identifier, . . . ) message with the HSS to determine if SCS/AS is authorized to send a group addressing request. The HSS maps group member External-Device-IDs to Internal-Device-IDs, if received (optimized procedure) from the GMF.

Step A03 and A04: On successful authentication, the GMF maintains External-Group-ID information along with the Geo Service Area information, if needed, and confirms to the SCS/AS. For optimized procedure, binding of group member Internal-Device-IDs with External-Group-ID is also maintained. The status of such group members is marked 'inactive'.

Phase B: Identify Group Members and Location Tracking, if Needed:

When the device (UE) performs application level registration, from UE External ID the SCS/AS determines the application specific Group(s) that the device (UE) is a member of. SCS/AS sends Join Group Request message with the identity of such application specific Group(s) to the GMF. The GMF associates/maps the UE as a member to the respective Group(s) and starts tracking UE location information, if needed. Application registration confirmation to the UE can include information such as the application specific Group(s) that are supported at the device (UE) and any other information as needed.

For optimized procedure, SCS/AS initiated Join Group Request/Response procedure is not performed. After UE EPS bearer is established, the HSS informs the GMF about the device (UE) being available. The GMF marks group member status as 'active'.

Step B00: UE establishes EPS bearer.

Step B01: The application on the UE registers with the SCS/AS. Such registration includes UE External ID.

Step B02: From UE External ID, the SCS/AS determines the application specific Group(s) that the device (UE) is a member of and sends Join Group Request message to the GMF. External-Group-ID(s) of the application specific Group(s) that the device (UE) is subscribed to, and the UE External ID are included in the Join Group Request message. HSS interrogation may be needed to map UE External IDs to UE Internal IDs. Such GMF interaction with the HSS is not shown in the procedure flow.

Step B02 is not performed for optimized procedure. Instead step Bx02 is performed.

Step Bx02: This step is performed for optimized procedure only. After UE EPS bearer is established, the HSS informs GMF about the device (UE) being available.

Step B03 and B04: GMF requests the PCRF to subscribe to UE location tracking, if needed. For stationary devices (UEs) the HSS can provide UE location information after step B02 or at step Bx02. GMF associates/maps UE as a member of the application specific Group(s) and maintains UE location information also, if needed, along with UE group membership information. Group member status is marked as 'active'.

ULI reporting via PCRF is one of the methods for location information tracking. Appropriate location tracking procedures can be used depending on the frequency and granularity of location information tracking needed.

Location information of the UEs that are outside the Geo Service Area is marked as "out-of-service area". Group messages are not delivered to such UEs.

Step B05: GMF informs SCS/AS of UE's successful joining of the application specific Groups(s). This step is not performed for optimized procedure.

Step B06: The SCS/AS acknowledges to the UE with App Registration Response message. Such registration confirmation can include information about the application specific Group(s) that are supported at the device (UE) and any other information as needed.

Phase C: Update Group Membership:

If the group membership information is updated at the SCS/AS, such as a device (UE) is no longer subscribed to an application specific Group(s), such information can be passed to the GMF. The GMF removes UE Group membership information for such application specific Group(s).

Step C01: The SCS/AS informs the GMF about update of application specific Group membership status. For example, if a device (UE) is no longer subscribed to an application specific Group(s), such information can be passed to the GMF. Update Group Member Request message identifies the application specific Group(s) (via External-Group-ID(s)) and the device(s) via their External IDs. The reason for the update, such as Add/Remove from a Group are also be included in this message.

Step C02 and C03: The GMF updates UE Group membership information for the identified application specific Group(s) and confirms to the SCS/AS.

Impacts on Existing Nodes and Functionality

Group Management Function (GMF): This new function provides the following capabilities: Support messages from the SCS/AS as identified in the procedure flows; interact with the HSS for managing Group membership and Group Member status information; support delivery of Group Messages to geographic areas as requested by the SCS/AS, if needed; perform procedures for UE location tracking, if needed; maintain mapping between the group identifier, device group membership, device status, and information related to geographic service area and device location, if needed.

Example Embodiment 4

Applications generally involve a group of devices. Typically applications today involve more than 1000 subscriptions for a single customer. From both customer and operator points of view, there is benefit in optimized handling of groups of devices.

Group based addressing and identifiers are useful to support group based features such as delivery of group messaging and group policing.

Architectural Considerations

The following group addressing and identifiers related requirements could to be met in various embodiments (some or all):

The network supports the ability to group subscriptions together.

The network can determine whether a subscription is a member of a specific group or not (e.g. using the respective group identifier).

The network can address the individual devices within a group on an individual basis.

In this aspect, a device can belong to more than one group and thus may be individually addressed due to its membership to a group.

Group Identifiers are Unique within a PLMN

Group Identifiers are independent of specific set of group features. As an example group identifiers used for identifying users belonging to a group for delivery of message(s) to the group can be different from group identifiers used for policing.

devices. MTC devices can host multiple applications with each application involving different group of devices. The devices that belong to a Group are referred to as 'Group Members'. Thus, a Group can involve 100s or 1000s of Group Members. Group membership can be static or can evolve dynamically, with Group Members being added and/or removed during the lifetime of a Group. The Service Capability Server (SCS)/Application Server (AS) can create new Groups with associated Group Members, and can remove existing Groups.

As per MTC architecture specified in TS23.682, it is possible for the SCS/AS to communicate with multiple underlying networks, with Group Members being spread across different underlying networks. Such underlying networks could be one or more 3GPP operator networks (PLMNs) or could be non-3GPP networks as well. Group Members that are mobile, can move in and out of coverage of the PLMNs.

This solution enables the delivery of group based messages by an SCS/AS to the Group Members that are receiving services from a PLMN. SCS/AS specific Groups are identified by External-Group-IDs. Within the PLMN the External-Group-ID can be mapped to an Internal-Group-ID. The identity of the 3GPP devices (e.g. IMSI) that are member of a Group are bound to the Group's External/Internal-Group-ID. Both, static and dynamic binding of Group Members to External/Internal-Group-ID are supported. A 3GPP device can host multiple applications, and the identity of a 3GPP device can be bound to more than one External/Internal-Group-ID.

Figure 9:
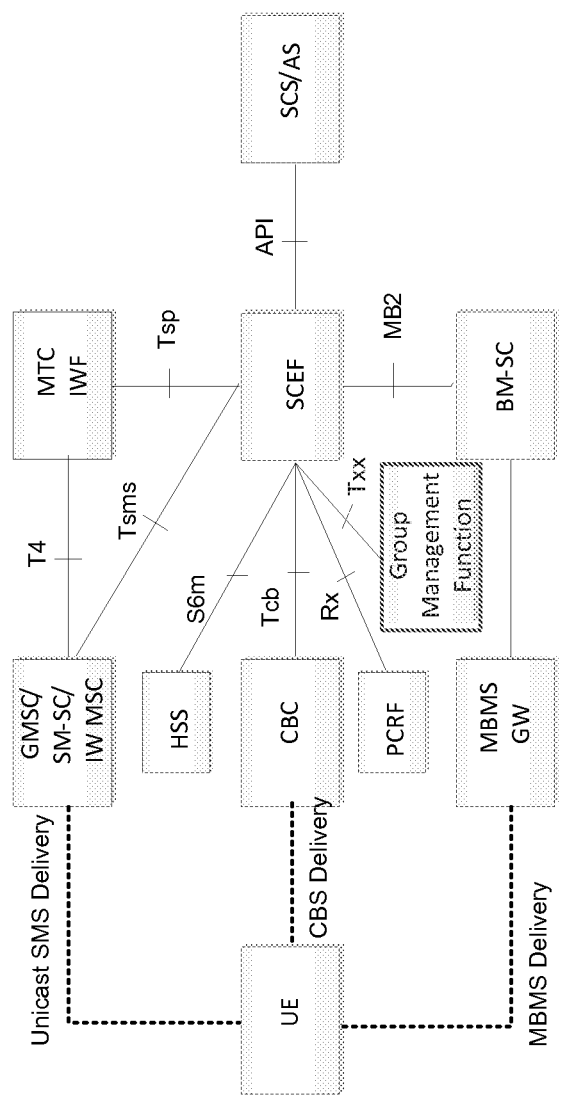
FIG. 9 shows an example of architecture for Group Based Addressing by SCS/AS and Identification of Group Members in a Geographic Area.

FIG. 9 shows the high level architecture that allows dynamic binding of the identity of Group Members to the Group's External/Internal-Group-ID. Tracking of PLMN specific location information of the Group Members is also supported. Such tracking of location information of the Group Members is needed for geographic location specific delivery of group messages.

The architecture illustration in FIG. 9 shows a new functional entity: the Group Management Function (GMF). GMF communicates with the Service Capability Exposure Function (SCEF) and maintains binding between the External-Group-ID and the associated Internal-Group-ID, if Internal-Group-ID is supported within the 3GPP network. In addition, the GMF maintains binding of the device identity of the Group Members (e.g. IMSI) with the Group's External/Internal-Group-IDs. Location information of Group Members is also be maintained at the GMF, if needed for supporting geographic location specific delivery of group messages.

In one configuration, the GMF can be a standalone functional entity. In this configuration the SCEF and the GMF communicate over Txx interface. In such configuration new interfaces between the GMF and other EPC entities such as HSS, PCRF, CBS, GCS AS etc. may also be used. Such new interfaces could be standardized interfaces or service provider specific interfaces.

In another configuration, the GMF can be integrated with some other EPC functional entity such as HSS, GCS AS, CBE etc. In such alternative configuration, the SCEF and GMF communicate over the existing interfaces. For example, if GMF is integrated with the HSS, SCEF and GMF communications takes place over S6m interface. Other configurations for the placement of the GMF within the EPC can also be supported.

Figure 10:
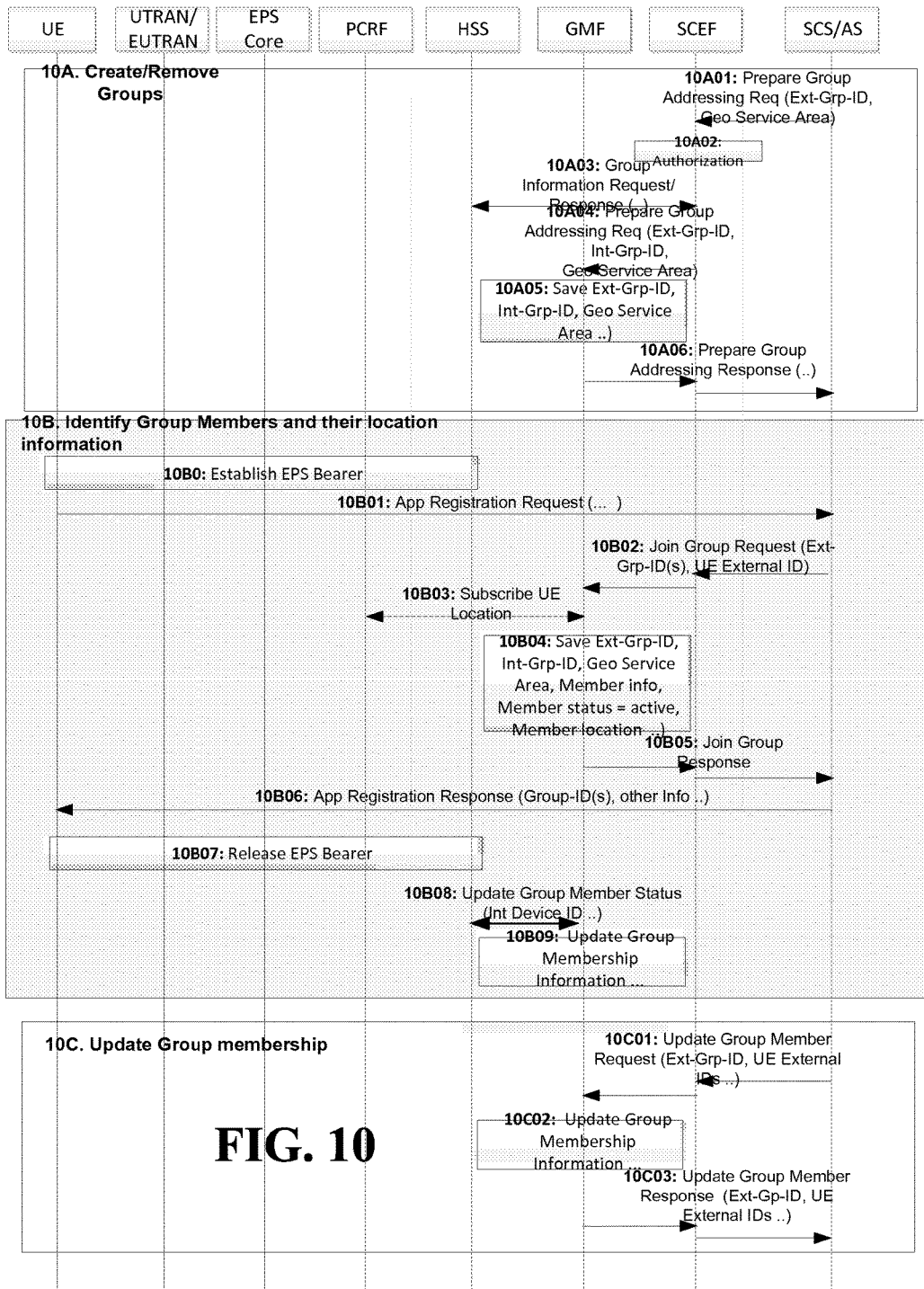
FIG. 10 shows an example of a procedure Flow for Group Based Addressing and Identification of Group Members.

FIG. 10 illustrates the procedure flow for group based addressing and identification of group members. This procedure flow considers GMF as a standalone entity. Similar procedures apply if GMF is integrated with the SCEF or with one of the other EPC functions, such as the HSS.

Phase 10A: Create/Remove Groups in the 3GPP network:

The SCS/AS informs the GMF via the SCEF about the Groups that are to be supported in the 3GPP network. The SCEF checks if the SCS/AS is authorized to send such a request before passing the request to the GMF. The SCEF may communicate with the HSS for obtaining such authorization and for the mapping of External-Group-ID to Internal-Group-ID, if needed.

Similarly, the SCS/AS informs the GMF via the SCEF if a an already assigned Group is to be removed in the 3GPP network.

Step 10A01: SCS/AS requests the GMF via the SCEF to support a Group(s) for group addressing by sending Prepare Group Addressing Request message. The message includes the External-Group-ID(s), and may include the Geo Service Area information also that identifies the geographic area within which group message delivery is to be performed.

When Geo Service Area information is not provided, group messages are to be delivered across the PLMN service area.

Prepare Group Addressing Request may include the identity of the devices (identified as UE External IDs) that are member of the Group identified by the External-Group-ID. This option is recommend if all Group Members are being served by this PLMN. For this case, the optimizations to the procedure flows are described in clause 5.2.3.1.3 (3GPP document TR 23.769).

Step 10A02: SCEF checks that the SCS/AS is authorized to send such a request for group addressing.

Step 10A03: SCEF may exchange Group Information Request/Response (External-Group-ID, SCS/AS Identifier, . . . ) message with the HSS to determine if the SCS/AS is authorized to send a group addressing request message, and to retrieve any group specific subscription data, such as the mapping of External-Group-ID to Internal-Group-ID. As an alternative, the SCEF can provide the mapping between the External-Group-ID and the Internal-Group-ID, if needed.

Step 10A04: On successful authentication, the SCEF forwards Prepare Group Addressing Request to the GMF, along with Group's Internal-Group-ID, if available.

Step 10A05 and 10A06: GMF saves information about the assigned Internal-Group-ID (if available) and the Geo Service Area with the External-Group-ID and confirms to the SCS/AS via the SCEF.

For the case the request is for removing an already assigned Group, the information relating to the identified External-Group-ID is removed from the GMF at step A05.

Phase B: Identify Group Members and their Location Information:

The device (UE) performs Application level registration with the SCS/AS. From UE External ID, the SCS/AS determines the Group(s) that the device (UE) is a member of. SCS/AS sends Join Group Request message with the identity of such Group(s) to the GMF via the SCEF. The GMF associates/maps the UE as a member to the respective Group(s) and starts tracking UE location information e.g. by using ULI procedures with the PCRF. For stationary devices, location information can be part of subscription information that the GMF can obtain from the HSS. In this case location tracking of the UEs is not needed. After the UE successfully joins as a member of the identified Group(s), the SCS/AS confirms Application level registration to the UE. Such registration confirmation can include information such as the Group(s) that are supported at the device (UE), and any other information as needed.

Step 10B00: UE establishes EPS bearer.

Step 10B01: The application on the UE registers with the SCS/AS. Such registration includes UE External ID.

Step 10B02: From UE External ID, the SCS/AS determines the Group(s) that the device (UE) is a member of and sends Join Group Request message to the GMF via the SCEF. External-Group-ID of the Group that the device (UE) is subscribed to, and the UE External ID are included in the Join Group Request message. For devices subscribed to multiple groups, multiple External-Group-IDs are sent by the SCS/AS.

The GMF associates/maps the UE as member of the Group(s) identified by External-Groups-ID(s). HSS/HLR interrogation may be needed to map UE External ID to UE Internal ID. HSS/HLR interrogation may also be needed to obtain the address of the serving CN node (e.g. MME/SGSM) for the UE, and UE Power Saving Mode (PSM) capability/status. Such GMF integration with the HSS/HLR is not shown in the procedure flows. Step B03 and B04: GMF requests the PCRF to subscribe to UE location information. ULI procedure is invoked to retrieve UE location. When the UE changes location, the PCRF is aware of the change of location and reports it to the GMF with appropriate reporting frequency. Such UE location information can be in the form of Cell-ID. For stationary devices (UEs) the HSS/HLR can provide location information of the UE to the GMF. GMF stores UE location information along with UE group membership information. Other information such as address of serving CN node (e.g. MME/SGSN) and UE PSM capability/status can also be stored at the GMF.

ULI reporting via PCRF is one of the methods for location information tracking. Other location retrieval procedures can also be used for this purpose, e.g. for stationary type UEs, the location can be pre-configured in the HSS/HLR which can be retrieved via HSS/HLR query.

Group membership information of the UEs that are outside the Geo Service Area is marked as "out-of-service area". Group messages are not delivered to such UEs.

Step 10B05: GMF via the SCEF informs SCS/AS of UE's successful joining of the Groups(s).

Step 10B06: The SCS/AS acknowledges to the UE with App Registration Response message. Such registration confirmation can include information about the Group(s) that are supported at the device (UE) and any other information as needed.

Step 10B07, 10B08 and 10B09: When the EPS bearer for the UE is released, the HSS/HLR may inform the GMF about the device (UE) not being available. Depending on the cause of the release of the EPS bearer, UE Group membership information at the GMF can be marked as 'inactive' or be removed. An 'inactive' Group membership information is marked as 'active' when the UE re-establishes the EPS bearer.

For the case the UE releases the EPS bearer with power down indication, UE Group membership information can be removed.

A lifetime timer can be associated the 'inactive' UE Group membership information. The SCS/AS can refresh UE Group information at the GMF periodically for successfully registered UEs. The timer value for such refreshes from the SCS/AS is set smaller than the timer value associated with 'inactive' UE registrations.

Phase 10C: Update Group Membership:

If the group membership information is updated at the SCS/AS, such as a device (UE) is no longer subscribed to a Group(s), such information can be passed to the GMF. The GMF removes UE Group membership information for the Group(s) identified by the SCS/AS.

Step 10001: The SCS/AS informs the GMF via the SCEF about update of Group membership status. For example, if a device (UE) is no longer subscribed to a Group(s), such information can be passed to the GMF. Update Group Member Request message identifies the Group(s) (via External-Group-ID(s)) and the device(s) via their External IDs. The reason for the update, such as Add/Remove from a Group can also be included in this message.

Step 10C02 and 10C03: The GMF updates UE Group membership information for the defied Group(s) and confirms to the SCS/AS via the SCEF.

Figure 11:
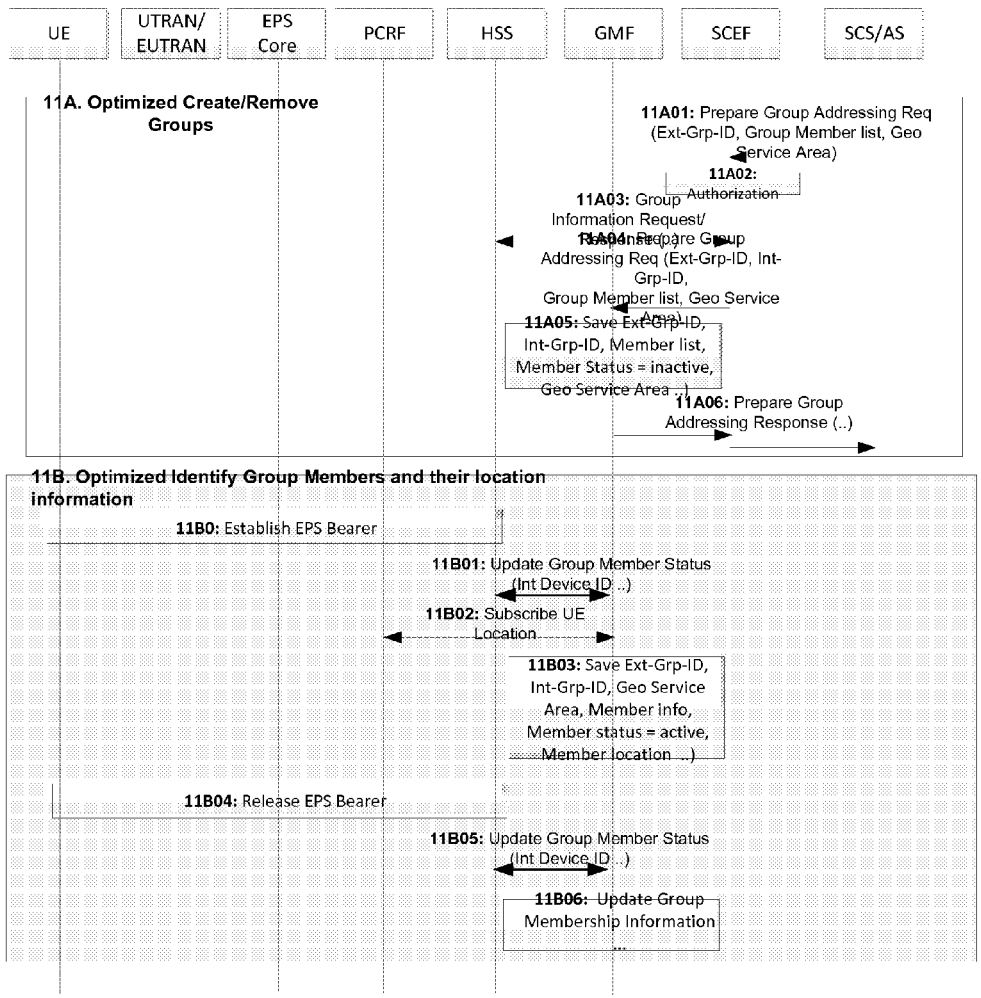
FIG. 11 shows an example of an optimized procedure flow for Group Based Addressing and Identification of Group Members.

With respect to FIG. 11 identification of group members. This procedure flow assumes that that all Group Members are being served by this PLMN. This procedure flow could be useful for the case the devices (UEs) are dedicated to a single application.

Phase 11A: Optimized Create/Remove Groups in the 3GPP Network:

Step 11A01: SCS/AS requests the GMF via the SCEF to prepare for group addressing by sending Prepare Group Addressing Request message. The message includes the External-Group-ID, and may include the Geo Service Area information also that identifies the geographic area within which group message is to be delivered. In addition, the identity of the devices (UEs) that are subscribed as member of this Group, in the form of UE External IDs, are also include in the Prepare Group Addressing Request message, When Geo Service Area information is not provided, group messages are to be delivered across the PLMN service area.

Step 11A02: SCEF checks that the SCS/AS is authorized to send such a request for group addressing.

Step 11A03: SCEF may exchange Group Information Request/Response (External-Group-ID, SCS/AS Identifier, . . . ) message with the HSS/HLR to determine if the SCS/AS is authorized to send a group addressing request message, and to retrieve any group specific subscription data, such as the mapping of External-Group-ID to Internal-Group-ID, and the mapping of UE External IDs to UE Internal IDs. As an alternative, the SCEF can provide a mapping between External-Group-ID and Internal-Group-ID, if needed.

Step 11A04: On successful authentication, the SCEF forwards Prepare Group Addressing Request to the GMF, along with the Internal-Group-ID, if available. In addition, the identity of the devices (UEs) that are subscribed as member of this Group, in the form of UE Internal IDs, are also included in the message.

Step 11A05 and 11A06: GMF saves information about the assigned Internal-Group-ID (if available) and the Geo Service Area with the External-Group-ID. Information about the Group Members in the form of UE Internal IDs is also saved at the GMF. Status of such Group Members is marked as 'inactive'. GMF then confirms successful operation to the SCS/AS via the SCEF.

For the case the request is for removing an already assigned Group, the information relating to the identified External-Group-ID is removed from the GMF at step 11A05. In this case, the identity of the Group Members is not included in the message at Step A01.

Phase 11B: Optimized Identify Group Members and their Location Information:

Step 11B00: UE establishes EPS bearer.

Step 11B01: When UE EPS bearer is established, the HSS/HLR informs the GMF about the device (UE) being available.

Step 11B02: GMF requests the PCRF to subscribe to UE location information. ULI procedure is invoked to retrieve UE location. When UE changes location, the PCRF is aware of the change of location and reports it to the GMF with appropriate reporting frequency. Such UE location information can be in the form of Cell-ID. For stationary devices (UEs) the HSS/HLR can provide location information of the UE to the GMF.

ULI reporting via PCRF is one of the methods for location information tracking. Other location retrieval procedures can also be used for this purpose, e.g. for stationary type UEs, the location can be pre-configured in the HSS/HLR which can be retrieved via HSS/HLR query.

Step 11B03: GMF marks UE Group Member as 'active' and stores UE location information as well.

Group membership information of the UEs that are outside the Geo Service Area is marked as "out-of-service area". Group messages are not delivered to such UEs.

Step 11B04, 11B05 and 11B06: When the UE EPS bearer is released, the HSS/HLR may inform the GMF about the device (UE) not being available. Depending on the cause of the release of the EPS bearer, UE Group membership information at the GMF can be marked as 'inactive' or be removed. An 'inactive' Group membership information is marked as 'active' when the UE re-establishes the EPS bearer.

For the case the UE releases the EPS bearer with power down indication, UE Group membership information can be removed.

A lifetime timer can be associated the 'inactive' UE Group membership information. The SCS/AS can refresh UE Group information at the GMF periodically for successfully registered UEs. The timer value for such refreshes from the SCS/AS is set smaller than the timer value associated with 'inactive' UE registrations.

Phase 11C: Update Group Membership:

Update Group membership procedure flows are similar to the procedure described in clause 5.2.3.1.2.

Impacts on Existing Nodes and Functionality

Group Management Function (GMF):

This is a new functional entity and provides the following capabilities:
- support messages from the SCS/AS as identified in the procedure flows;
- interact with the HSS/HLR for managing Group membership and Group Member status information;
- support delivery of Group Messages to geographic areas as requested by the SCS/AS;
- perform Rx interface procedure to collect UE location information, if needed;
- maintain mapping between the group identifier, geographic service areas, group membership and location of group members.

Example Embodiment 5

With reference to FIG. 4, shows the high level architecture, wherein a Group Management Function (GMF) is hosted/supported at the SCEF. The GMF maintains binding of the identity of group members (e.g. IMSI) with group's External-Group-ID and other information needed for the delivery of group messages, For example, for a PLMN that supports MBMS, the GMF maintains the TMGIs allocated to the groups also. Mapping of External-Group-IDs to Internal-Group-IDs, and location information of the group members can also be maintained at the GMF, if needed.

Other possible configurations, such as the GMF being a standalone functional entity, or GMF integrated with some EPC functional entity can also be supported.

Figure 12:
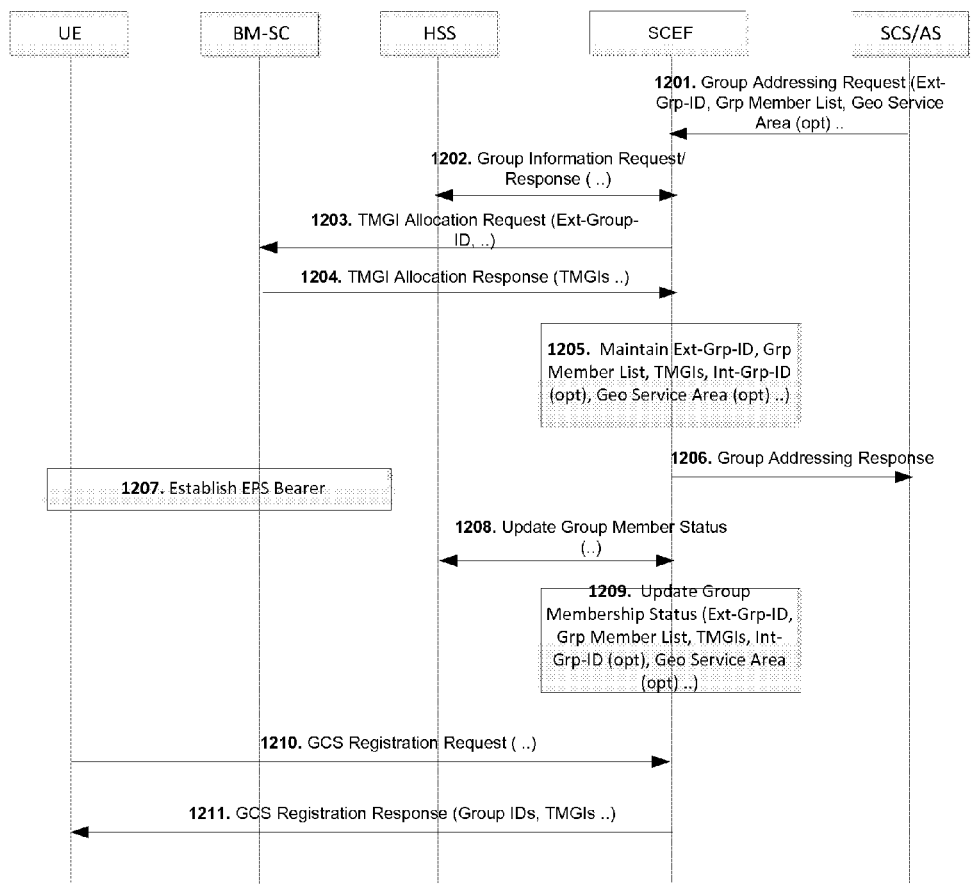
FIG. 12 shows an example of a procedure Flow for Group Based Addressing and Identification of Group Members.

FIG. 12 illustrates the procedure flow for group based addressing and identification of group members. In this illustration, the SCEF hosts the GMF. is co-located with the SCEF. The SCEF hosts GCS-AS function as well for supporting MBMS services.

Step 1201: SCS/AS requests the SCEF support for an application specific group by sending Group Addressing Request message. The message includes the External-Group-ID and the identity of the devices (UEs) that are member of such Group. Other information such as Geo Service Area information may also be included if geographic area specific delivery of group messages is needed.

When Geo Service Area information is not provided, group messages are delivered across the PLMN service area.

Step 1202: GMF function in the SCEF exchanges Group Information Request/Response message with the HSS to determine if SCS/AS is authorized to send a group addressing request. HSS maps group member External-Device-IDs to Internal-Device-IDs. Ext-Group-ID may also be mapped to Int-Group-ID, if needed. This step may be performed concurrently with Steps 3 and 4.

Step 1203: GCS-AS sends TMGI Reservation Request to BM-SC with External-Group-ID information.

Step 1204: BM-SC reserves TMGI(s) for the group and informs GCS-AS.

As an alternative, TMGI(s) may be assigned via pre-configuration. Based on operator policy, SCS/AS service provider and 3GPP network operator collaborate for the pre-configuration of TMGI(s) for groups identified by Ext-Group-IDs.

Step 1205: GMF maintains mapping of External-Group-ID with information such as group member Internal-Device-IDs, allocated TMGIs, reachability status of the group members etc. Geo Service Area and Internal-Group-ID associated with the group can also be maintained.

Step 1206: SCEF confirms to the SCS/AS with Group Addressing Response message.

Step 1207: UE establishes EPS bearer.

Step 1208: After UE EPS bearer is established, the HSS can inform the GMF about the device (UE) reachability status, location information etc. by the use of Update Group Membership Request/Response. Such an update procedure can be used by the SCEF also for updating group membership information at the HSS, as needed.

SCEF may invoke UE location tracking procedures for the delivery of geographic area specific group messages, as needed.

Step 1209: Group membership information at the SCEF is updated.

Step 1210: For UEs that support MBMS, GCSE Application on the UE registers with the GCS-AS over GC1.

Step 1211: GCS-AS function in the SCEF sends GCS Registration Response to the UE that include the TMGI(s) for the group(s) that the applications on the UE are subscribed to.

For UEs that do not support MBMS, Application Layer registration request/response with SCS/AS results in the SCS/AS informing the UE about the groups(s) that the applications on the UE are subscribed to. Such UEs are marked as non-MBMS capable such that alternative methods for the delivery of group messages can be used for such UEs.

In this embodiment, the Group Management Function at the SCEF may be designed to support messages from the SCS/AS, as identified in the procedure flows, interact with the HSS for managing Group membership and Group Member status information, support delivery of Group Messages to geographic areas as requested by the SCS/AS, if needed, perform procedures for UE location tracking, if needed, and maintain mapping between the group identifier, device group membership, device status, and information related to geographic service area and device location, if needed.

It will be appreciated by one of skill in the art that that the present document describes techniques for group communication to a group of user devices in which formation and management of two different types of groups, one catering to entities internal to a mobile network, and the other catering to external application servers, are disclosed.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method implemented at a network-side in a communication network, the method comprising:
    deploying, on a first computer platform, a first group management module that enables at least one of creation of a first group of user devices, deletion of the first group of user devices, update to membership of the first group of user devices and communication to the first group of user devices;
    facilitating group communication from an application server to members of the first group of user devices;
    deploying, on a second computer platform, a second group management module that enables at least one of creation of a second group of user devices, deletion of the second group of user devices, update to membership of the second group of user devices and communication to the second group of user devices;
    facilitating network-internal communication from a network operator managed entity to members of the second group of user devices; and
    assigning network-internal identifiers to each user device in the second group of user devices such that the network-internal identifiers are made unavailable to the application server.

2. The method of claim 1, further including tracking current locations and identities of devices that are members of the first group of user devices.

3. The method of claim 2, wherein the tracking current location includes locating a given user device in a wired communication network.

4. The method of claim 2, further comprising:
delivering, based on the tracking, group messages to the devices that are members of the first group of user devices.

5. The method of claim 1, further including:
assigning external identifiers to each user device in the first group of user devices such that for a shared user device that belongs both to the first group of user devices and the second group of user devices, the shared user device's network-internal identifier is made available to a network server but not the application server and the shared user device's external identifier is made available to the application server but not the network server.

6. A communication apparatus comprising:
a memory for storing instruction; and
a processor for reading the instructions from the memory and implementing a method, comprising:
deploying, on a first computer platform, a first group management module that enables at least one of creation of a first group of user devices, deletion of the first group of user devices, update to membership of the first group of user devices and communication to the first group of user devices;
facilitating group communication from an application server to members of the first group of user devices;
deploying, on a second computer platform, a second group management module that enables at least one of creation of a second group of user devices, deletion of the second group of user devices, update to membership of the second group of user devices and communication to the second group of user devices;
facilitating network-internal communication from a network operator managed entity to members of the second group of user devices; and
assigning network-internal identifiers to each user device in the second group of user devices such that the network-internal identifiers are made unavailable to the application server.

7. The communication apparatus of claim 6, further including tracking current locations and identities of devices that are members of the first group of user devices.

8. The communication apparatus of claim 7, wherein the tracking current location includes locating a given user device in a wired communication network.

9. The communication apparatus of claim 7, wherein the method further includes:
delivering, based on the tracking, group messages to the devices that are members of the first group of user devices.

10. The communication apparatus of claim 6, further including:
assigning external identifiers to each user device in the first group of user devices such that for a shared user device that belongs both to the first group of user devices and the second group of user devices, the shared user device's network-internal identifier is made available to a network server but not the application server and the shared user device's external identifier is made available to the application server but not the network server.

11. A communication system comprising a first computer platform and a second computer platform
wherein the first computer platform is configured to:
enable at least one of creation of a first group of user devices, deletion of the first group of user devices, update to membership of the first group of user devices, and communication to the first group of user devices; and
facilitate group communication from an application server to members of the first group of user devices;
wherein the second computer platform is configured to:
deploy, on a second computer platform, a second group management module that enables at least one of creation of a second group of user devices, deletion of the second group of user devices, update to membership of the second group of user devices and communication to the second group of user devices, wherein the communication system assigns network-internal identifiers to each user device in the second group of user devices such that the network-internal identifiers are made unavailable to the application server; and
facilitate network-internal communication from a network operator managed entity to members of the second group of user devices.

12. The communication system of claim 11, wherein the communication system further tracks current locations and identities of devices that are members of the first group of user devices.

13. The communication system of claim 12, wherein the tracking current location includes locating a given user device in a wired communication network.

14. The communication system of claim 12, wherein the communication system further delivers group messages to the devices that are members of the first group of user devices.

15. The communication system of claim 11, wherein the communication system assigns external identifiers to each user device in the first group of user devices such that for a shared user device that belongs both to the first group of user devices and the second group of user devices, the shared user device's network-internal identifier is made available to a network server but not the application server and the shared user device's external identifier is made available to the application server but not the network server.

* * * * *